United States Patent [19]
Carlson

[11] 4,141,114
[45] Feb. 27, 1979

[54] MOLLUSK SHUCKER

[76] Inventor: Harold C. Carlson, 8806 Pacific Ave, P.O. Box 826, Wildwood Crest, N.J. 08260

[21] Appl. No.: 832,144

[22] Filed: Sep. 12, 1977

[51] Int. Cl.² ............................................. A22C 29/04
[52] U.S. Cl. ................................................. 17/74; 17/48
[58] Field of Search ................................. 17/74, 48, 51

[56] References Cited
U.S. PATENT DOCUMENTS

| | | | |
|---|---|---|---|
| 2,047,688 | 7/1936 | Jenkins | 17/48 |
| 2,337,188 | 12/1943 | Geldermaus et al. | 17/48 |
| 2,608,716 | 9/1952 | Harris | 17/74 X |
| 3,007,801 | 11/1961 | Lapeyre et al. | 17/48 X |
| 3,564,648 | 2/1971 | Snow | 17/48 X |
| 3,566,438 | 3/1971 | Snow | 17/48 X |

*Primary Examiner*—Frank T. Yost
*Attorney, Agent, or Firm*—Seidel, Gonda & Goldhammer

[57] ABSTRACT

The shell of a mollusk is caused to open as the mollusk is being conveyed through a heated rotary tube. The conveyor in the tube and spaced radially inwardly from the inner periphery of the tube moves the mollusk along the tube while enabling the mollusk to be subjected to steam created in the tube by vaporization of water.

11 Claims, 5 Drawing Figures

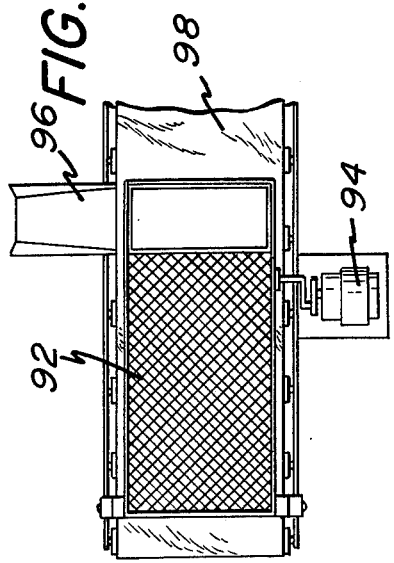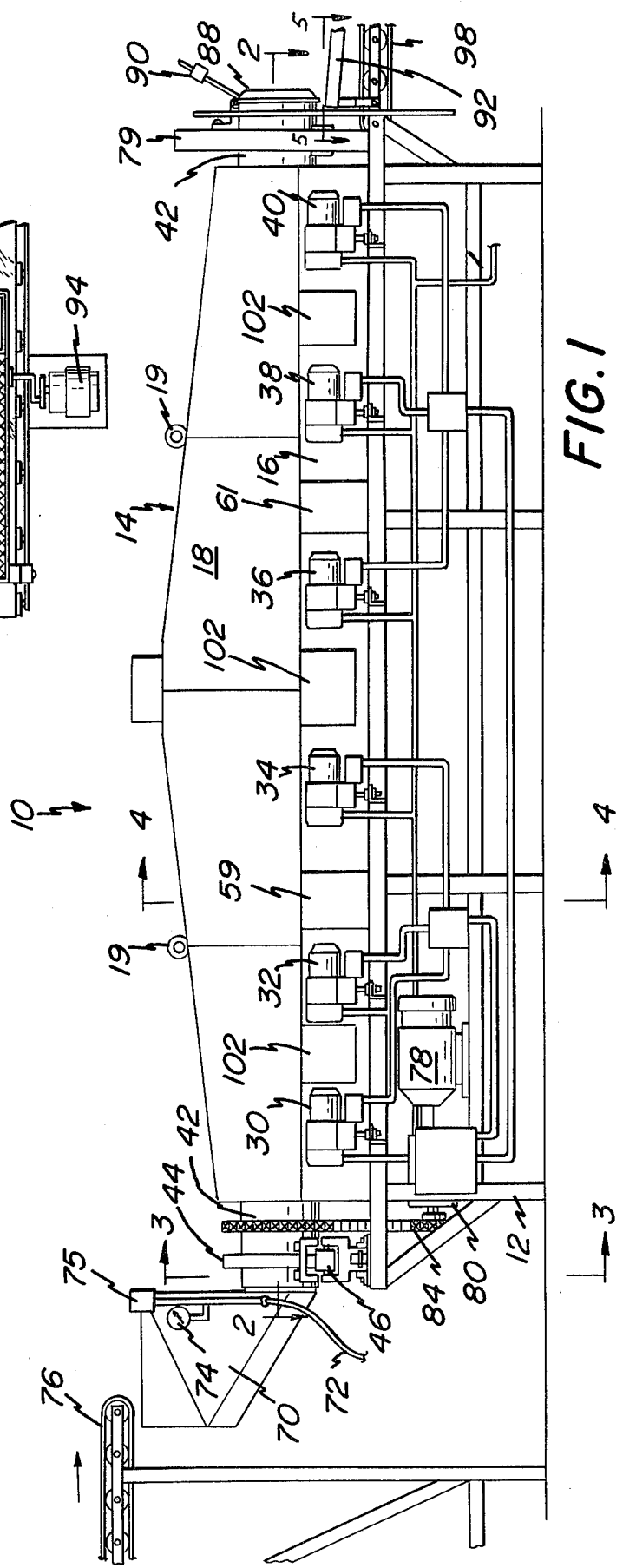

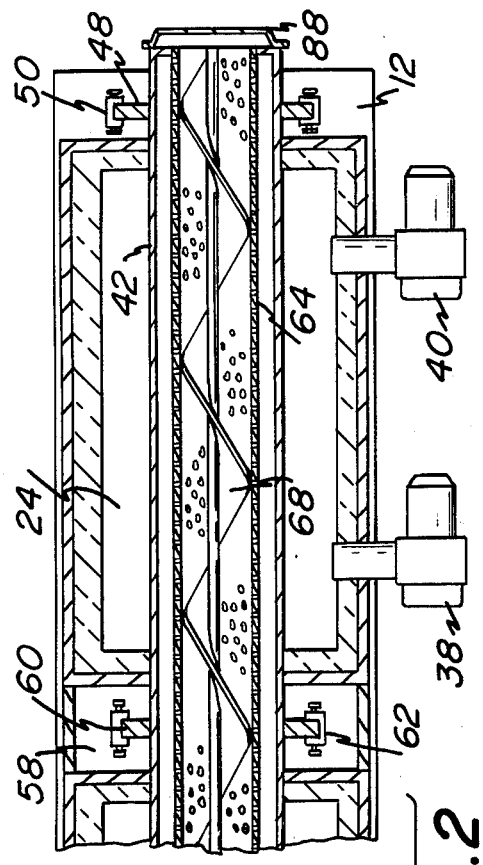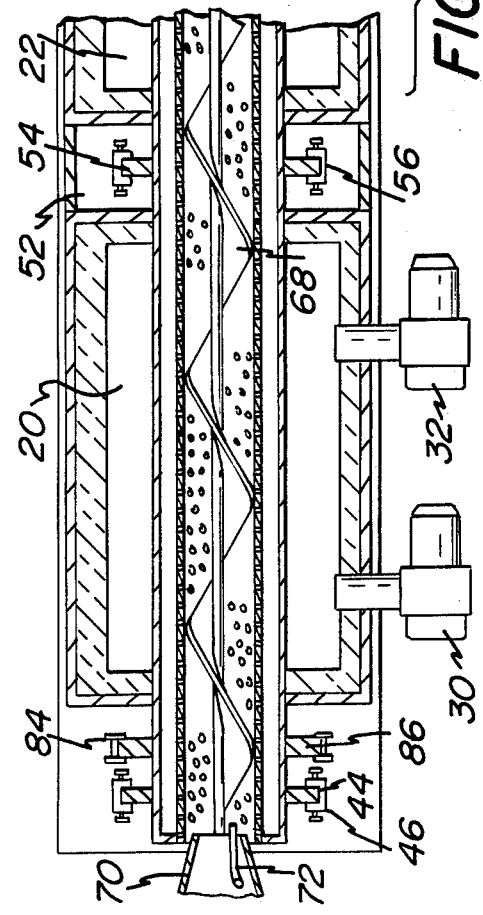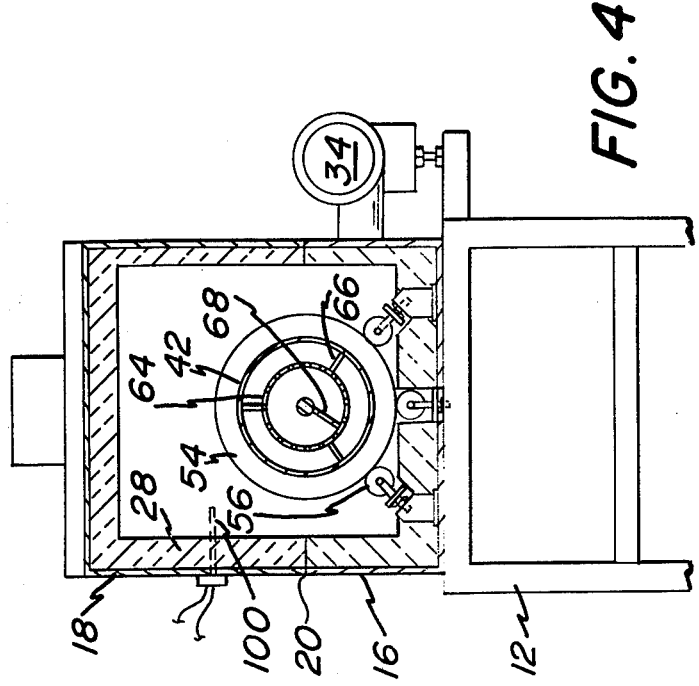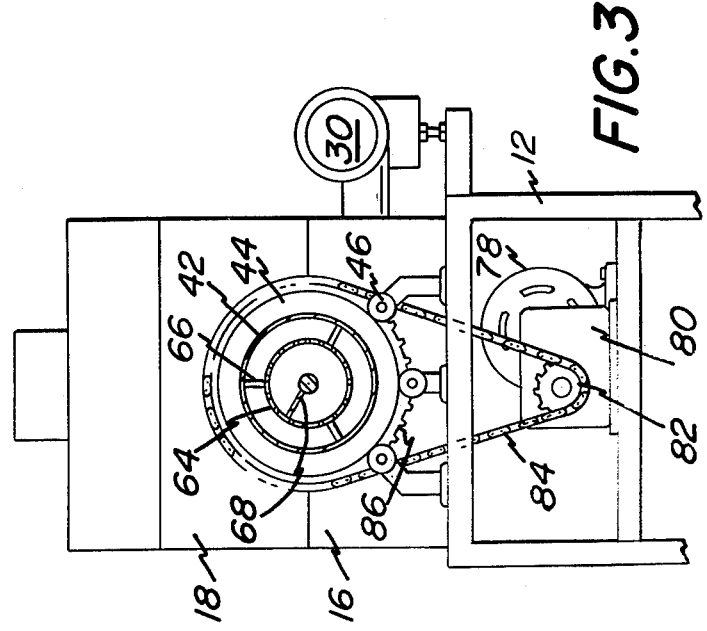

MOLLUSK SHUCKER

BACKGROUND

In order to attain access to the edible portion of a bivalve mollusk, it is necessary to open the mollusk shells. While a mullusk may be processed by manually cracking open the shell, such handling is impractical on a production basis because of high labor costs, low rate of production, etc. The use of mechanical apparatus to process mullusks for causing separation of the shells is known. For example, see U.S. Pat. No. 2,047,688.

Prior art devices which subject the shells to heat by conduction are relatively inefficient. It has been proposed to tumble the shells as they are being heated. Such tumbling improves the efficiency of transmitting heat into the mullusk shells. A major deficiency of the prior art is the failure to efficiently utilize the heat available whereby production rates are much slower than those capable of being attained.

SUMMARY OF THE INVENTION

The apparatus of the present invention includes an insulated housing which encloses an elongated metal tube having an inlet at one end and an outlet at the other end. A heater means is provided for heating the tube to a temperature sufficient to vaporize water within said tube. A means is provided for introducing water into the tube adjacent the inlet end thereof.

A motor means is provided for rotating the tube about its longitudinal axis. A conveyor means is provided in said tube and spaced radially inwardly from the inner periphery of said tube. The conveyor means supports the mollusk and moves them along the tube so that the mollusk can be subjected to steam created in the tube by vaporization of water within the tube. A hopper communicates with the conveyor means adjacent the inlet end of the tube for feeding thereinto mollusks to be opened during passage through the tube.

It is an object of the present invention to provide novel apparatus for automatically opening mollusks in a manner which is simple, efficient, and easy to maintain.

It is another object of the present invention to provide apparatus for opening mollusks which provides for increased production and facilitates adjustment for processing different types of mollusks.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a side elevation view of apparatus in accordance with the present invention.

FIG. 2 is a sectional view taken along the line 2—2 in FIG. 1.

FIG. 3 is a sectional view taken along the line 3—3 in FIG. 1.

FIG. 4 is a sectional view taken along the line 4—4 in FIG. 1.

FIG. 5 is a top plan view at the discharge end of the apparatus as seen along the line 5—5 in FIG. 1.

Referring to the drawings in detail, wherein like numerals indicate like elements, there is shown in FIG. 1 apparatus in accordance with the present invention for shucking mollucks and designated generally as 10.

The apparatus 10 includes a frame 12 made from angle iron or other convenient material and adapted to be supported on a floor. A housing designated generally as 14 includes a lower section 16 which is stationary and secured to the frame 12 as well as an upper section 18. The upper section 18 is provided with lifting lugs 19 so that it may be lifted vertically to facilitate access to components to the apparatus disposed within the housing 14.

The housing 14 is preferably divided into a plurality of discrete heating chambers 22, 24 and 26. See FIG. 2. The parting line 20 between the lower section 16 and the upper section 18 of the housing 14 is shown more clearly in FIGS. 3 and 4. Also, it will be apparent from FIGS. 2–4 that the various sections of the housing are provided with insulation on the inner surface thereof facing the heating chambers 20, 22 and 24.

A least one, and preferably two, heater means is provided for each of the chambers 20–24. Thus, chamber 20 is provided with oil burners 30, 32. Chamber 22 is provided with oil burners 34, 36. Chamber 24 is provided with oil burners 38, 40. The insulation within the various chambers 20–24 is preferably thicker on the side wall opposite from the burners. In this regard, the insulation on the side wall adjacent the burners 30–40 may be 2 inches while the insulation on the opposite side wall is a greater thickness such as 3 inches.

A metal tube 42 is rotatably supported on the housing 14. Tube 42 is longer than the length of the housing 14 and projects from each end of the housing. For the purposes of this disclosure, the lefthand end of the tube 42 in the drawings is the inlet end and the righthand end of the tube 42 is the outlet end. Tube 42 has a substantial diameter such as 15 inches. At its inlet end, the tube 42 has a ring 44 welded thereto. The ring 44 is supported by a plurality of rollers 46 adjacent its lower periphery. See FIG. 3. At its discharge end, the tube 42 is provided with a ring 48 secured to its outer periphery. The ring 48 is supported by a plurality of similarly disposed rollers 50.

Depending upon the length of the apparatus 10, intermediate support may be provided for the tube 42. Thus, a chamber 52 may be provided between chambers 20, 22 and a chamber 58 may be provided between chambers 22, 24. A ring 54 may be attached to the tube 42 for rolling support by the rollers 56 in chamber 52. Likewise, a ring 60 may be secured to the tube 42 for rolling support by the rollers 62 in chamber 58. Panel 59 facilitates access to chamber 52 and panel 61 facilitates access to chamber 58. See FIG. 1.

A conveyor means is provided for moving the mollusks longitudinally along the tube 42 from its inlet end to its outlet end. At the same time, the conveyor means supports the mollusks so that they are spaced radially inwardly from the periphery of tube 42. Referring to FIGS. 2 and 4, there is provided a conveyor 64 within tube 42. Conveyor 64 is a cylindrical duct having perforated walls so that the space therewithin is in direct communication with the space between the outer periphery of conveyor 64 and the inner periphery of tube 42. Conveyor 64 is maintained in spaced relationship with the tube 42 and is rotatable therewith by means of a plurality of radially disposed spacers 66. As will be apparent from FIG. 4, tube 42 and conveyor 64 are coaxial. Conveyor 64 on its inner periphery is provided with a helical flight 68 for causing mollusks to move longitudinally through the tube 42 as tube 42 and conveyor 64 rotate about their longitudinal axes.

As shown more clearly at the lefthand end of FIGS. 1 and 2, a supply hopper 70 is provided for automatically feeding mollusks into conveyor 64. A water conduit 72 is provided which extends downwardly into the hopper and then terminates at a discharge end disposed within the conveyor 64 as shown more clearly at the lefthand end of FIG. 2. Conduit 72 is preferably provided with a pressure gauge 74 and a pressure sensor 75. A supply conveyor 76 may be provided for discharging mollusks into the hopper 70. A drive motor for conveyor 76, not shown, is synchronized with the speed of rotation of tube 42.

A variable speed A.C.-D.C. motor 78 is supported by the frame 12. See FIGS. 1 and 3. The output of motor 78 is connected by way of gear box 80 to a drive sprocket 82. A gear 86 is secured to the outer periphery of tube 42. See FIGS. 2 and 3. A chain 84 extends around sprocket 82 and gear 86. Motor 78 provides for a selective speed of rotation of the tube 42.

The outlet end of tube 42 is closed by a door 88 pivotably supported on frame portion 79. Door 88 may be provided with a counterweight 90 which is selectively adjustable so that the discharging mollusks may cause the door 88 to pivot to an open disposition. Door 88 prevents drafts through the tube 42 and acts as a steam lock.

Mollusks discharged from tube 42 drop a short distance onto a shaker table 92. Table 92 is perforated and is vibrated by motor 94. See FIG. 5. The shells accumulate at the lower end of the angularly disposed table 92 and discharge through chute 96. A conveyor belt 98 is supported beneath the table 42 and receives the edible portion of the mollusks which are transported for further processing.

The temperature within the chambers 20, 22 and 24 are separately controlled by a discrete thermocouple in each of the chambers. The electric supply for the motors of each chamber is connected in series with the associated thermocouple. When the temperature within a chamber such as chamber 24 reaches the desired temperature, the motors for burners 38, 40 are interrupted. The water pressure sensor 75 is in series with each of the thermocouples 100 so that all burner motors are automatically shut down when the pressure of the water in conduit 72, as detected by sensor 75, is below a predetermined setting.

The apparatus 10 operates as follows. Water is continuously supplied into the conveyor 64 by conduit 72 at a suitable rate such as 6 gallons per minute. The tube 42 is heated by the burners 30–40. The water supplied by conduit 72 accumulates in the space between tube 42 and conveyor 64 and is converted into steam. Mollusks supplied by conveyor 76 discharge into the hopper 70 having an angularly disposed bottom wall and flow by gravity into the conveyor 64.

As the tube 42 and conveyor 64 rotate about their longitudinal axes, the helical flight 68 moves the mollusks along the tube 42 and continuously causes the mollusks to flip over. Steam generated within tube 42 is concentrated along the longitudinal axis thereof which is the zone through which the mollusks are being conveyed. The heat of the steam causes the mollusks to open. The mollusks are more uniformly exposed to the steam by being flipped over as they are moved longitudinally along the tube 42 in spaced relationship to the inner periphery of tube 42.

The temperature to which the mollusks are exposed is controlled by the speed with which they move through the tube 42 which in turn is controlled by the speed of rotation of tube 42. The variable speed motor 78 facilitates accurate control of the speed of rotation of tube 42 whereby 300 bushels of scallops per hour can be passed through the tube 42. As the mollusks discharge from tube 42, they push open the door 88 and discharge onto the shaker table 92.

When the mollusks arrive on the shaker table 92, the shells have fully opened. Any tendency of the edible portion to stick to the shell is minimized by vibration of the shaker table 92. The size of the holes in shaker table 92 enables the edible portion to drop therethrough onto the conveyor belt 98 while the shells accumulate at the lower end of the shaker table 92 and discharge through tube 96 to the suitable receptable.

If for any reason the pressure of the water in supply conduit 72 falls below a preset desired rate, each of the burners 30–40 will automatically be shut off. This is desirable since insufficient water is being introduced into the tube 42 for conversion into steam. When the temperature in the chambers 20, 22 and 24 reaches a predetermined desired maximum such as 1200° F., the motors for the burners associated with the chambers automatically shut off. When the temperature drops below a desired minimum, the thermocouples automatically start the motors in response to actuation of a relay switch coupled to the thermocouples. Each of the chambers 20, 22 and 24 has its own access panel 102 which is removable to facilitate access into the chamber for any minor maintenance. Access to the tube 42 at central portions thereof and for purposes of major maintenance is attained by lifting upper section 18 of the housing 14 by means of a hoist connected to lifting lugs 19. Appropriate guards may be provided in the area of the rollers 46, 50, and the gear 86 and at any other locations considered necessary for protection and safety of the operators. It will be noted that the apparatus 10 is completely automatic. The rollers which support the tube 42 are preferably spring mounted so as to compensate for temperature expansion and contraction. See FIG. 4. All of the burners are exterior of the housing 14 so that they may be readily unbolted and serviced or replaced.

The burners 30–40 preferably burn diesel fuel since it is quieter and cheaper than natural or propane gas while being pollution free. I have found that the burners only consume a total of 9 gallons of fuel per hour with the tube 42 rotating at a speed of a about 15 rpm while processing scallops. The present invention produces unexpected results as a result of the more effective use of heat. Thus, the present invention has a residence time of 43 seconds for mollusks in tube 42 while 60 seconds are required when conveyor 64 is eliminated and a helical flight is attached directly to the inner periphery of tube 42.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for opening mollusks comprising:
   (a) an insulated housing,
   (b) an elongated metal tube having an inlet end and an outlet end, a major portion of the length of said tube being disposed within said housing,
   (c) heater means for heating said tube to a temperature sufficient to vaporize water in said tube,
   (d) means for introducing water into said tube, (e) motor means connected to said tube for rotating said tube about its longitudinal axis, (f) conveyor means in said tube and spaced radially inwardly from the inner periphery of said tube for supporting mollusks in spaced relation to the tube inner periphery and for moving mollusks along said tube while enabling the mollusks to be subjected to steam created in said tube by vaporization of water in said tube, and (g) a hopper communicating with said conveyor means adjacent said tube inlet end for feeding mollusks to said conveyor means.

2. Apparatus in accordance with claim 1 wherein said conveyor means is a perforated cylindrical duct connected to said tube in spaced relation with its inner periphery and rotatable with said tube.

3. Apparatus in accordance with claim 1 including a door movably supported adjacent the outlet end of said tube and movable to a position for permitting discharge of mollusks for the outlet end of said tube.

4. Apparatus in accordance with claim 1 wherein said housing is comprised of mating sections defining a plurality of chambers, said tube extending through each of said chambers, said heater means including a plurality of heaters, at least one heater associated with each chamber.

5. Apparatus in accordance with claim 4 including a discrete temperature sensor in each chamber for controlling the heater associated therewith so as to maintain the temperature in each chamber within a predetermined range, said means for introducing water including a water pressure sensor adapted to shut off each heater when the water pressure falls below a predetermined level.

6. In apparatus for opening mollusks comprising an elongated metal tube having an inlet end for receiving mollusks and an outlet end for discharging mollusks, means supporting said tube for rotation about its longitudinal axis, heater means outside said tube for introducing heat at a sufficient temperature to cause mollusk shells to open while the mollusk shells are disposed within said tube, and conveyor means for causing mollusks to move along and adjacent to the longitudinal axis of said tube, said conveyor means including a conveyor disposed within said tube for supporting mollusks in spaced relation to the inner periphery of said tube and for moving mollusks along said axis of said tube, said conveyor having holes therethrough so as to be permeable to gases.

7. Apparatus in accordance with claim 6 wherein said conveyor means is a perforated duct coaxial with said tube, said duct being connected to said tube for rotation therewith, and motor means connected to said tube for rotating said tube about its longitudinal axis.

8. Apparatus in accordance with claim 7 including a helical flight on the inner periphery of said duct, and a cover adjacent the outlet end of said tube.

9. Apparatus in accordance with claim 6 including a hopper, a supply conveyor for supplying mollusks to said hopper, said hopper communicating with said conveyor means adjacent one end of said tube, and a separator table adjacent the outlet end of said tube for receiving the meat of mollusks and the shells of mollusks for separating said shells from said meat.

10. Apparatus in accordance with claim 6 including a housing surrounding a major portion of the length of said tube, said housing having at least one chamber surrounding the outer periphery of said tube, at least one oil burner for heating said chamber and said tube within said chamber, said tube having at least two rings in spaced relationship and fixedly secured to the outer periphery of said tube, a plurality of rollers supporting each ring, said rollers being spring biased into contact with their associated ring so that they may accommodate the temperature changes of said ring.

11. Apparatus in accordance with claim 6 including means for introducing an aqueous liquid into said tube.

* * * * *